(12) United States Patent
Park et al.

(10) Patent No.: US 11,493,315 B2
(45) Date of Patent: *Nov. 8, 2022

(54) BLASTING SYSTEM AND OPERATING METHOD FOR SAME

(71) Applicant: HANWHA CORPORATION, Seoul (KR)

(72) Inventors: Ki Woong Park, Boeun-gun (KR); Tae Seob Shin, Boeun-gun (KR)

(73) Assignee: HANWHA CORPORATION, Seoul (KR)

(*) Notice: Subject to any disclaimer, the term of this patent is extended or adjusted under 35 U.S.C. 154(b) by 402 days.

This patent is subject to a terminal disclaimer.

(21) Appl. No.: 16/633,005

(22) PCT Filed: Dec. 16, 2019

(86) PCT No.: PCT/KR2019/017763
§ 371 (c)(1),
(2) Date: Jan. 22, 2020

(87) PCT Pub. No.: WO2020/138796
PCT Pub. Date: Jul. 2, 2020

(65) Prior Publication Data
US 2021/0080241 A1 Mar. 18, 2021

(30) Foreign Application Priority Data
Dec. 28, 2018 (KR) .................. 10-2018-0172283

(51) Int. Cl.
| | | |
|---|---|---|
| *F42D 1/055* | (2006.01) | |
| *E21B 7/02* | (2006.01) | |
| *H04Q 9/00* | (2006.01) | |
| *E04G 23/08* | (2006.01) | |
| *F42D 3/00* | (2006.01) | |
| *F42D 3/04* | (2006.01) | |

(52) U.S. Cl.
CPC .............. *F42D 1/055* (2013.01); *E21B 7/022* (2013.01); *E21B 7/027* (2013.01); *H04Q 9/00* (2013.01);
(Continued)

(58) Field of Classification Search
CPC ... F42D 1/055; F42D 3/00; F42D 3/04; F42D 1/045; F42D 5/00; E21B 7/022;
(Continued)

(56) References Cited

U.S. PATENT DOCUMENTS

| | | | | |
|---|---|---|---|---|
| 4,226,184 A | * | 10/1980 | Ljungberg | ................ F42B 3/26 102/322 |
| 6,957,707 B2 | * | 10/2005 | Koivunen | ............... E21B 7/022 175/38 |

(Continued)

FOREIGN PATENT DOCUMENTS

| | | |
|---|---|---|
| JP | 2000-186486 A | 7/2000 |
| JP | 2012-510014 A | 4/2012 |

(Continued)

*Primary Examiner* — Hassan Kizou
*Assistant Examiner* — Abdullahi Ahmed
(74) *Attorney, Agent, or Firm* — WHDA, LLP

(57) ABSTRACT

The present disclosure relates to a blasting system, the blasting system including: a drilling device configured to form blasting holes on a blasting target on the basis of a blasting design map; a charging device configured to place explosives in the blasting holes; detonators configured to detonate the explosives; a central control unit configured to confirm a position of a worker in real time, the worker driving the detonators; and a worker terminal configured to transmit worker position information to the central control unit, the worker position information indicating the worker position. The blasting system of the present disclosure can automatically connect the detonator to the central control unit, and improve worker convenience of the blasting work.

11 Claims, 11 Drawing Sheets

(52) U.S. Cl.
CPC ............... *E04G 23/08* (2013.01); *F42D 3/00* (2013.01); *F42D 3/04* (2013.01); *H04Q 2209/40* (2013.01)

(58) Field of Classification Search
CPC ...... E21B 7/027; H04Q 9/00; H04Q 2209/40; E04G 23/08; E04G 23/083
See application file for complete search history.

(56) References Cited

U.S. PATENT DOCUMENTS

| | | |
|---|---|---|
| 7,791,858 B2 | 9/2010 | Hummel et al. |
| 11,221,200 B2* | 1/2022 | Kuk ..................... F42D 1/045 |
| 2005/0103219 A1 | 5/2005 | McClure et al. |
| 2008/0307993 A1* | 12/2008 | Chan ..................... F42B 3/113 |
| | | 102/214 |
| 2014/0026775 A1* | 1/2014 | Papillon ................. F42D 1/055 |
| | | 102/215 |
| 2020/0355483 A1* | 11/2020 | Laakko .................. F42D 1/055 |
| 2021/0080241 A1* | 3/2021 | Park ....................... E21B 7/027 |
| 2021/0102792 A1* | 4/2021 | Guyon .................. F42D 1/055 |

FOREIGN PATENT DOCUMENTS

| | | |
|---|---|---|
| JP | 2017-141635 A | 8/2017 |
| JP | 2017-167031 A | 9/2017 |
| KR | 10-2017-0019598 A | 2/2017 |
| WO | 2008/078288 A1 | 7/2008 |

\* cited by examiner

| POSITION INFORMATION | IDENTIFIER | SETTING INFORMATION | DELAY TIME | INITIALIZATION TIME | GROUP | BLASTING RADIUS |
|---|---|---|---|---|---|---|
| P1 | I1 | S1 | D1 | T1 | G1 | BR |
| P2 | I2 | S2 | D2 | T2 | | |
| ⋮ | ⋮ | ⋮ | ⋮ | ⋮ | ⋮ | |
| Pn | In | Sn | Dn | Tn | Gm | |

FIG. 2

< FIRST POINT OF TIME TT1 >

| POINT OF RECEIVING REGISTER REQUEST | WORKER POSITION | DETONATOR POSITION CLOSEST TO WORKER POSITION WHEN RECEIVING REGISTER REQUEST |
|---|---|---|
| TT1 | W1 | P1 |
| TT2 | W2 | P2 |

BLASTING SYSTEM AND OPERATING METHOD FOR SAME

TECHNICAL FIELD

The present disclosure relates to a blasting system and an operating method for the same and, more particularly, to a blasting system and an operating method for the same, which are capable of automatically connecting a detonator to a central control unit, and of improving worker convenience of blasting work.

BACKGROUND ART

In general, explosives are used in engineering work, such as in rock blasting and in the demolition of buildings. That is, a plurality of holes, into which explosives are to be inserted, is drilled to correspond to the sections of a blasting target, i.e. the object to be blasted. After an explosive is inserted into each of the drilled holes, the explosives are connected to a blasting system. The explosives are ignited by operating the blasting system, thereby exploding the blasting target.

Such a blasting system includes a detonator serving as an igniter to ignite an explosive and a blasting device providing power necessary for the actuation of the detonator and a command signal to the detonator. Here, the detonator of the blasting system is generally implemented as an electric detonator. The electric detonator is disposed on an explosive side, and a plurality of electric detonators is connected to a single blasting device.

Such electric detonators may have a structure in which a plurality of detonators connected to a blasting device is simultaneously activated to simultaneously detonate explosives, or a structure in which a plurality of detonators connected to a blasting device is set to have different delay times to be sequentially activated to thus sequentially detonate explosives.

Although electric detonators simultaneously detonating a plurality of explosives have been used to date, electric detonators sequentially detonating a plurality of explosives are more commonly used at present. For example, blasting systems using such an electric detonator are disclosed in a plurality of documents, such as Korean Patent No. 10-1016538, Korean Patent No. 10-0665878, Korean Patent No. 10-0665880, Korean Patent No. 10-0733346, and Japanese Patent Application Publication No. 2005-520115.

Disclosure

Technical Problem

Accordingly, the present disclosure has been made keeping in mind the above problems occurring in the prior art, and an objective of the present disclosure is to provide a blasting system and an operating method for the same, which are capable of automatically connecting a detonator to a central control unit.

Another objective of the present invention is to provide a blasting system and an operating method for the same, which are capable of improving worker convenience of blasting work.

Technical Solution

In order to accomplish the above objective, the present disclosure provides a blasting system. The blasting system according to an embodiment of the present disclosure includes: a drilling device configured to form blasting holes on a blasting target on the basis of a blasting design map; a charging device configured to place explosives in the blasting holes; detonators configured to detonate the explosives; a central control unit configured to confirm a position of a worker in real time, the worker driving the detonators; and a worker terminal configured to transmit worker position information to the central control unit, the worker position information indicating the worker position, wherein the detonators may be configured such that, when a detonator is driven by the worker, the detonator may transmit a register request to the central control unit, and the central control unit may include a detonator setting part configured to match the worker position at a time when the central control unit receives the register request with the blasting design map, to identify the detonator transmitting the register request, and to transmit setting data corresponding to the identified detonator to the identified detonator, and the setting data may include setting information, an initialization time, and a delay time.

The detonator setting part may be configured to confirm a detonator closest to the worker position at the time when the central control unit receives the register request in the blasting design map, and to identify the confirmed detonator as the detonator transmitting the register request.

The central control unit may include: a storage part configured to store the blasting design map; a positioning part configured to confirm a position of the drilling device, a position of the charging device, and a position of the worker terminal; a display part configured to display the blasting design map, the position of the drilling device, the position of the charging device, and the position of the worker terminal; and a blasting controller configured to transmit blasting commands to the detonators.

When at least one of the drilling device, the charging device, and the worker terminal is positioned within a blasting radius, the blasting controller may generate no blasting command.

The central control unit further may include: a drilling controller generating a first alarm, when the drilling device reaches designed positions of the blasting holes, wherein, while the blasting holes are formed by the drilling device, the drilling controller may receive drilling data indicating a drilling state from the drilling device.

The central control unit further may include: a charging controller generating a second alarm, when the charging device reaches the designed positions of the blasting holes, wherein, while the explosives may be placed into the blasting holes by the charging device, the charging controller may receive charging data indicating a charging state from the charging device.

The display part may be configured to further display the drilling state and the charging state.

Further, the blasting system of the present disclosure may include: a monitoring device configured to capture in the air an image of a blasting field in which the blasting target is positioned.

In order to accomplish the above objective, the present disclosure provides an operating method for a blasting system. The operating method according to an embodiment of the present disclosure may include: creating a blasting design map including designed positions where blasting holes are formed on a blasting target; arranging the blasting system on a blasting field where the blasting target is positioned, the blasting system including a central control unit, a drilling device, a charging device, and a worker terminal; forming, by the drilling device, the blasting holes on the basis of the blasting design map; placing explosives and detonators in the blasting holes by the charging device and then driving the detonators by a worker; matching a worker position at a time when the central control unit receives a register request with the blasting design map, identifying a detonator transmitting the register request, and transmitting setting data corresponding to the identified detonator to the identified detonator; preparing for blasting; and transmitting a blasting command to the detonator, wherein the detonators may be configured such that, when a detonator is driven by the worker, the detonator may transmit the register request to the central control unit, and the setting data may include setting information, an initialization time, and a delay time.

The transmitting the setting data may include: receiving the register request by the central control unit; confirming, by the central control unit, a detonator closest to the worker position at the time when the central control unit receives the register request in the blasting design map; identifying, by the central control unit, the confirmed detonator as the detonator that transmits the register request; and transmitting, by the central control unit, the setting data corresponding to the identified detonator to the identified detonator.

The preparing the blasting may include: confirming positions of the drilling device, the charging device, and the worker terminal; determining whether or not at least one of the drilling device, the charging device, and the worker terminal is positioned within a blasting radius; and completing the blasting preparation, when at least one of the drilling device, the charging device, and the worker terminal is not positioned within the blasting radius.

Advantageous Effects

As described above, the blasting system and the operating method for the same according to embodiments of the present, disclosure can automatically connect the detonator to the central control unit.

In addition, the blasting system and the operating method for the same according to embodiments of the present disclosure can improve worker convenience of the blasting work.

The advantages obtainable from the present invention are not limited to the aforementioned advantages, and other advantages not explicitly disclosed herein will be clearly understood by those skilled in the art to which the present invention pertains from the description provided hereinafter.

DESCRIPTION OF DRAWINGS

FIG. 2 is a view showing a blasting design map according to an embodiment of the present disclosure;

Figure 1:
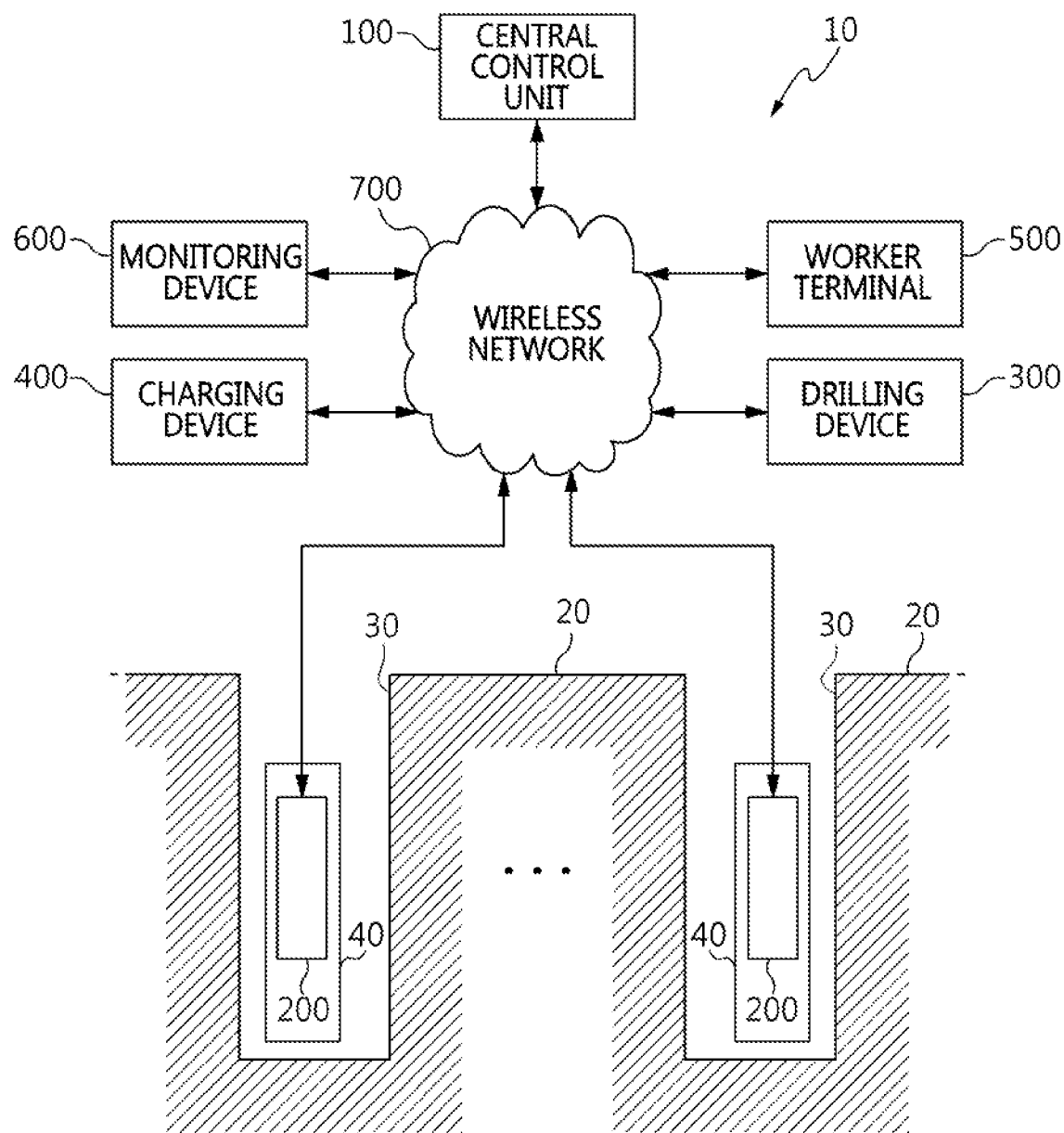
FIG. 1 is a view showing a blasting system according to an embodiment of the present disclosure.

| * Description of reference numerals * | |
|---|---|
| 10: blasting system | 20: blasting target |
| 30: blasting hole | 40: explosive |
| 100: central control unit | 200: detonator |
| 300: drilling device | 400: charging device |
| 500: worker terminal | 600: monitoring device |
| 700: wireless network | |

BEST MODE

Hereinafter, embodiments of the present disclosure and matters necessary for those skilled in the art to readily understand the features of the present disclosure will be described in detail with reference to the accompanying drawings. These embodiments are only provided for illustrative purposes, since the present, disclosure may be implemented in a variety of different forms without departing from the scope of the present disclosure defined by the claims.

In the drawings, the same components will be designated by the same reference numerals. In addition, the thicknesses, ratios, and sizes of the components may be exaggerated for effective descriptions of technical features. The expression "and/or" includes any one or any combination of the mentioned items.

Terms such as "first" and "second" may be used herein to describe a variety of elements, and the elements should not be limited by the terms. The terms are only used to distinguish one element from other elements. Thus, a first element may be referred to as a second element, and similarly, a second element may be referred to as a first element. Singular forms used herein are intended to mean "one or more" unless the context clearly indicates otherwise.

Terms, such as "below", "beneath", "under", "lower", "above", and "upper", may be used herein for ease of description of the relationship of an element to other elements as illustrated in the drawings, such terms should be construed as describing relative relationships, and are used with respect to the orientations depicted in the drawings.

It will be further understood that the terms "comprise", "include", "have", etc. when used in this specification, specify the presence of stated features, integers, steps, operations, components, parts, and/or combinations thereof, but do not preclude the presence or addition of one or more other features, integers, steps. operations, components, parts, and/or combinations thereof.

That is, the present disclosure is not limited to the embodiments disclosed below, and may be realized in various other forms. It will be understood that when an element is referred to as being "connected" to another element, not only can it be directly connected to the other element, but it can also be electrically connected to the other element via an intervening element. In designating elements of the drawings by reference numerals, the same elements will be designated by the same reference numerals even when they are shown in different, drawings.

FIG. 1 is a view showing a blasting system 10 according to an embodiment of the present disclosure.

Referring to FIG. 1, the blasting system 10 may include a central control unit 100, detonators 200, a drilling device 300, a charging device 400, a worker terminal 500, a monitoring device 600, and a wireless network 700.

The central control unit 100 may control the whole operation of the blasting system 10. Specifically, the central control unit 100 may confirm positions of the drilling device 300, the charging device 400, and the worker terminal 500 in real time. A detailed description thereof will be described in FIGS. 2 to 10.

The central control unit 100 may generate a blasting command. The central control unit 100 may transmit the blasting command to the detonators 200 through the wireless network 700. The detonators 200 may count a delay time on the basis of an initialization time. When counting the preset delay time is completed, each of the detonators 200 may detonate an explosive 40 connected thereto. Accordingly, the blasting system 10 may explode a plurality of explosives 40, and explode a blasting target 20.

The detonators 200 may be integrally formed with the explosives 40, and may detonate the explosives 40. For example, when the detonators 200 are driven by a worker, the detonators 200 may transmit the register requests to the central control unit 100 through the wireless network 700 in order to be connected with the central control unit 100. The detonators 200 may be connected with the central control unit 100 through the wireless network 700, and may be moved by being controlled by the central control unit 100. The detonators 200 may be set by setting data that is received from the central control unit 100. At this point, the setting data may include setting information, an initialization time, and a delay time of each of the detonators 200. Further, the detonators 200 may be exploded by the blasting command that is transmitted from the central control unit 100.

The drilling device 300 may form blasting holes 30 on the blasting target 20 on the basis of the blasting design map. In the specification, the drilling means that the blasting holes 30 are formed by drilling the blasting target 20. For example, the drilling device 300 may be connected with the central control unit 100 through the wireless network 700, and be operated by control of the central control unit 100. Further, the drilling device 300 may transmit position information or operation information of the drilling device 300 to the central control unit 100.

The charging device 400 may place the explosives 40 and the detonators 200 into the blasting holes 30. In the specification, the charging means that the explosive 40 and the detonators 200 are placed into the blasting holes 30. For example, the charging device 400 may be connected with the central control unit 100 through the wireless network 700, and may be moved by the control of the central control unit 100. The charging device 400 may transmit position information or operation information of the charging device 400 to the central control unit 100.

The worker can perform the blasting work with the worker terminal 500. For example, the worker can sequentially approach one of the detonators 200 after charging is completed, and then the worker can drive the detonator 200. In the specification, driving the detonator 200 may mean that the detonator 200 is powered on or switched from a sleep mode to a normal node.

The worker terminal 500 may be connected with the central control unit 100 through the wireless network 700. Further, the worker terminal 500 may generate position information indicating a position of a worker, and transmit the position information to the central control unit 100 through the wireless network 700.

The monitoring device 600 may capture in the air an image of a blasting field in which the blasting target 20 is positioned. For example, the monitoring device 600 may be connected with the central control unit 100 through the wireless network 700, and may capture an image of an indicated position under the control of the central control unit 100. Accordingly to the embodiment, the monitoring device 600 may be implemented as a drone.

The wireless network 700 may be implemented in all kind of wireless networks, such as mobile radio communication network including long term evolution (LTE), Bluetooth™, Bluetooth low energy (BLE), Zigbee, Thread, wireless-fidelity (Wi-Fi), wireless broadband internet (Wibro), and long range (LoRa).

The drilling device 300, the charging device 400, the worker terminal 500, and the monitoring device 600 may include a global positioning system (GPS) device that receives a satellite signal to determine a position.

Figure 3:
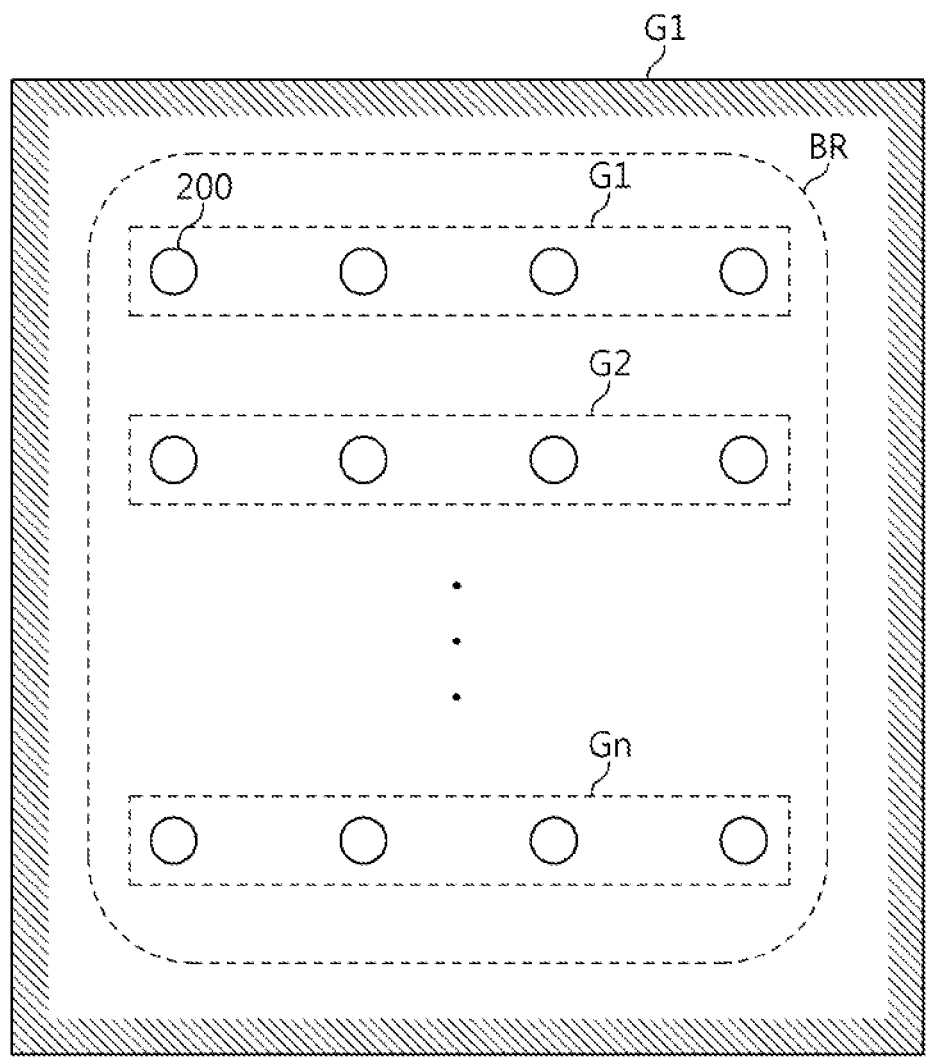
FIG. 3 is a view showing a blasting design map according to an embodiment of the present disclosure.

FIGS. 2 and 3 are views showing the blasting design map according to embodiments of the present disclosure.

Referring to FIGS. 1 to 3, for efficient blasting of the blasting target 20, the blasting design map may be created during blasting design. The created blasting design map may be stored in the central control unit 100.

On the basis of map data, the blasting design map may include position information (P1, P2, to Pn, n is a natural number of 3 or more) about designed positions of the blasting holes in which the detonators 200 are respectively disposed, group information (G1, G2, to Gm, m is a natural number of 3 or more) about each of the detonators 200, and identifiers (I1, I2, to In) of the detonators 200. However, the present disclosure is not limited thereto, and the detonators 200 may be grouped into one or two groups in some embodiments.

The blasting design map may include delay times (D1, D2, to Dn), setting information (S1, S2, to Sn), and initialization times (T1, T2, to Tn) for each of the detonators 200. In some embodiments, the initialization times (T1, T2, to Tn) for each of the detonators 200 may have the same value.

A blasting radius BR may mean a geographical range affected by the explosion of the explosives 40. For example, the blasting radius BR may be any area that is set up to define a safe area in which workers or devices are not affected by the blasting.

Figure 4:
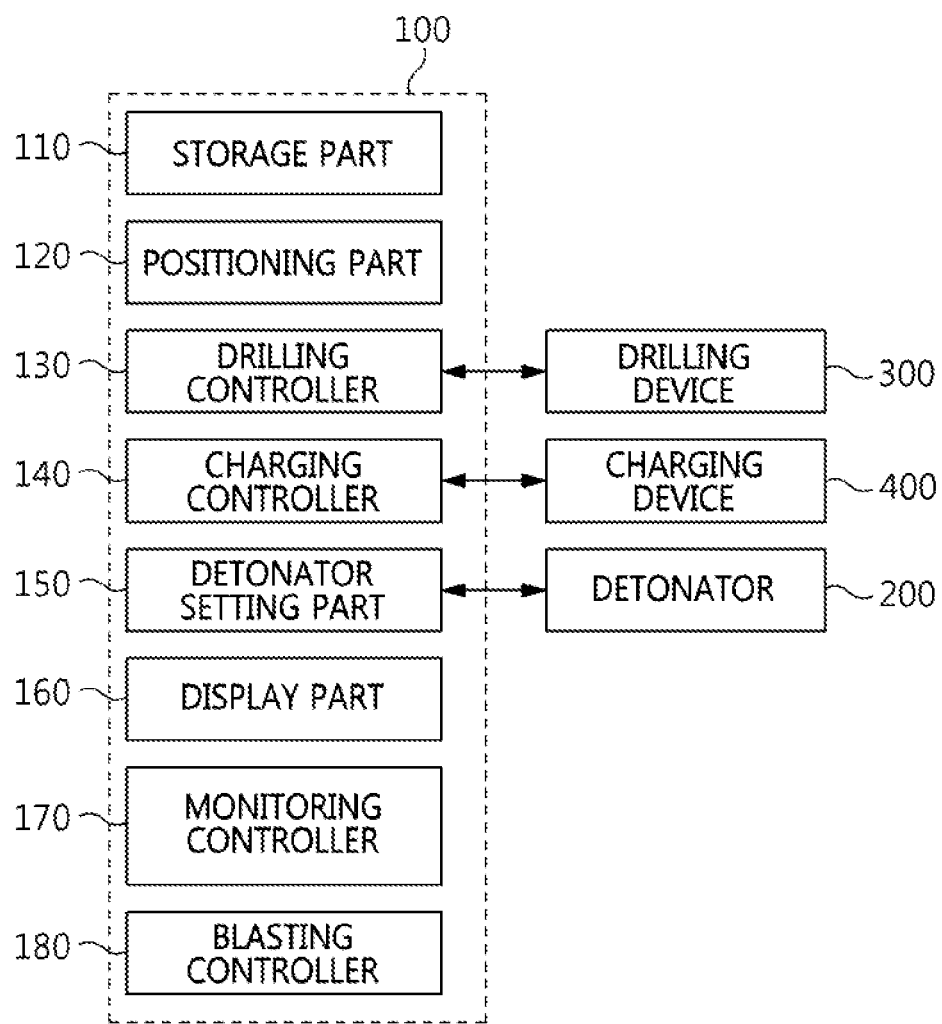
FIG. 4 is a view showing a central control unit according to an embodiment of the present disclosure.
Figure 5:
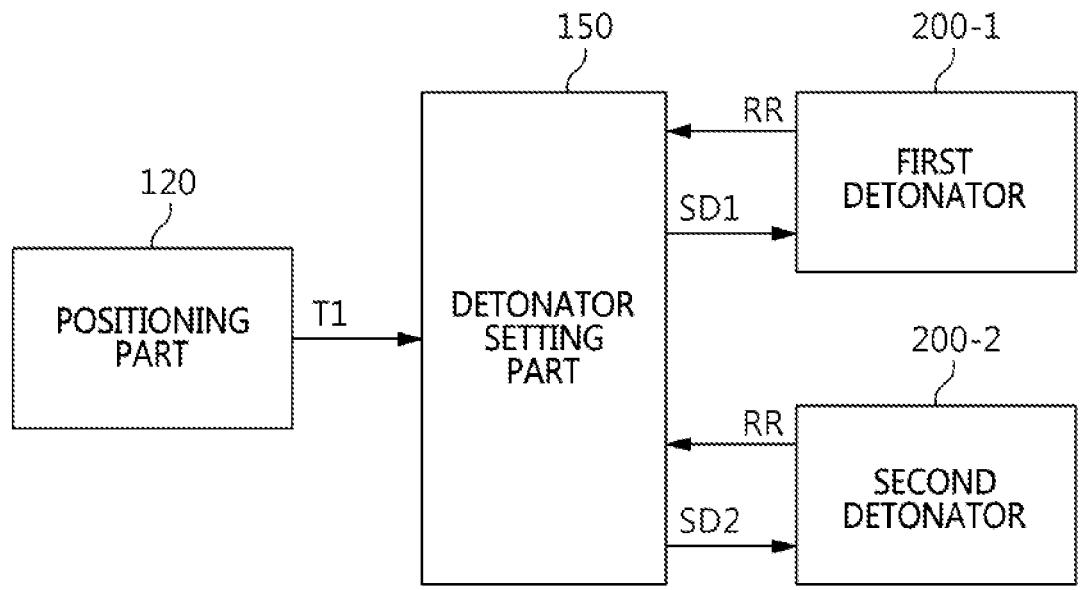
FIGS. 5 to 9 are views showing an operation of a detonator setting part according to an embodiment of the present disclosure.

FIG. 4 is a view showing the central control unit 100 according to the embodiment of the present disclosure.

Referring to FIGS. 1 to 4, the central control unit 100 may receive a storage part 110, a positioning part 120, a drilling controller 130, a charging controller 140, a detonator setting part 150, a display part 160, a monitoring controller 170, and a blasting controller 180.

The storage part 110 may store the blasting design map. In some embodiments, the storage part 110 may be implemented in a read only memory (ROM), a random access memory (RAM), a hard disk drive (HDD), a solid state drive (SSD), etc.

The positioning part 120 can identify positions of the drilling device 300, the charging device 400, and the worker terminal 500. For example, the positioning part 120 may identify the positions in real time by receiving position information from the drilling device 300, the charging device 400, and the worker terminal 500, or periodically transmitting radio technical commission for maritime services (RTCM) data to the drilling device 300, the charging device 400, and the worker terminal 500.

The drilling controller 130 may control operation of the drilling device 300. For example, when the drilling device 300 reaches the designed positions of the blasting holes 30, the drilling controller 130 may generate a first alarm. By the first alarm, the worker can confirm that the drilling device 300 has reached the designed positions of the blasting holes 30, and can control the operation of the drilling device 300. While the blasting holes 30 are formed by the drilling device 300, the drilling device 300 may generate drilling data indicating a drilling state. The drilling device 300 may transmit the drilling data to the drilling controller 130, and the drilling controller 130 may check the drilling state on the basis of the drilling data. In some embodiments, the drilling device 300 may include a motion sensor, a pressure sensor, etc., and the drilling data may indicate the motion or pressure of the drilling device 300.

The charging controller 140 may control an operation of the charging device 400. For example, when the charging device 400 reaches the positions of the blasting holes 30, the charging controller 140 may generate a second alarm. By the second alarm, the worker can check that the charging device 400 has reached the positions of the blasting holes 30, and can control the operation of the charging device 400. While the explosives 40 are placed by the charging device 400, the charging device 400 may generate charging data indicating a charging state. The charging device 400 may transmit the charging data to the charging controller 140, and the charging controller 140 may check the charging state on the basis of the charging data. In some embodiments, the charging device 400 may include a motion sensor, a pressure sensor, etc., and the charging data may indicate the motion or pressure of the charging device 400.

The detonator setting part 150 may receive a register request from the detonators 200. The detonator setting part 150 may match a position of the worker at the time when the central control unit receives the register request with the blasting design map. The detonator setting part 150 may identify the detonator 200 transmitting the register request, and may transmit setting data corresponding to the identified detonator to the identified detonator 200. A detailed description of the detonator setting part 150 in this regard is described in FIGS. 5 to 9.

The display part 160 may display the blasting design map, and positions of the drilling device 300, the charging device 400, and the worker terminal 500. Further, the display part 160 may display the drilling state. A detailed description of the display part 160 in this regard will be described in FIG. 10. In some embodiments, the display part 160 may be implemented in a liquid crystal display device, an organic light emitting display device, etc.

The monitoring controller 170 may control an operation of the monitoring device 600. For example, the monitoring device 600 may capture an image of the blasting field in the air, and prior to blasting, the monitoring controller 170 may control the monitoring device 600 to indicate to the worker whether the blasting is normally performed.

The blasting controller 180 may generate a blasting command for the detonators 200. For example, when at least one of the drilling device 300, the charging device 400, and the worker terminal 500 is positioned within the blasting radius BR, the blasting controller 180 may not generate the blasting command. When at least one of the drilling device 300, the charging device 400, and the worker terminal 500 is not positioned within the blasting radius BR, the blasting controller 180 may transmit the blasting command to the detonators 200.

FIGS. 5 to 9 are views showing an operation of a detonator setting part 150 according to the embodiment of the present disclosure. For convenience of description, a first detonator 200-1 and a second detonator 200-2 are shown in the drawing together, but the present disclosure is not limited thereto. In some embodiments, a detonator may be provided as various numbers.

Referring to FIGS. 5 to 9, the detonator setting part 150 may receive a worker position information TI from the positioning part 120 to confirm the worker position depending on the time, that is, a work path of the worker.

Figure 6:
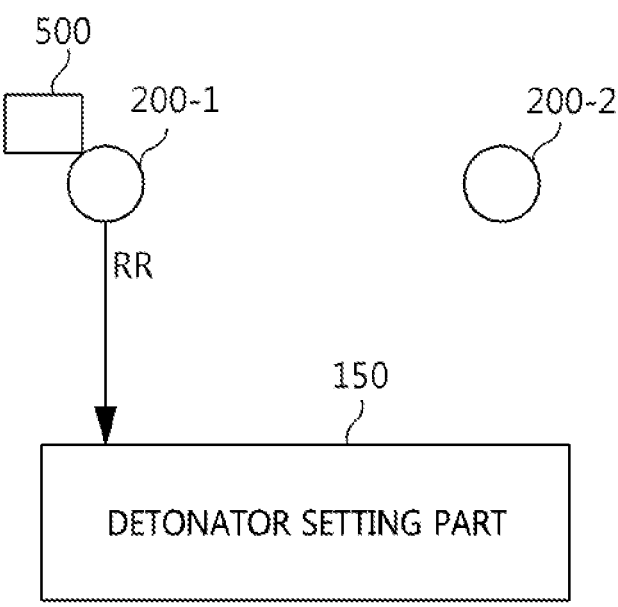
Figures 7, 8:
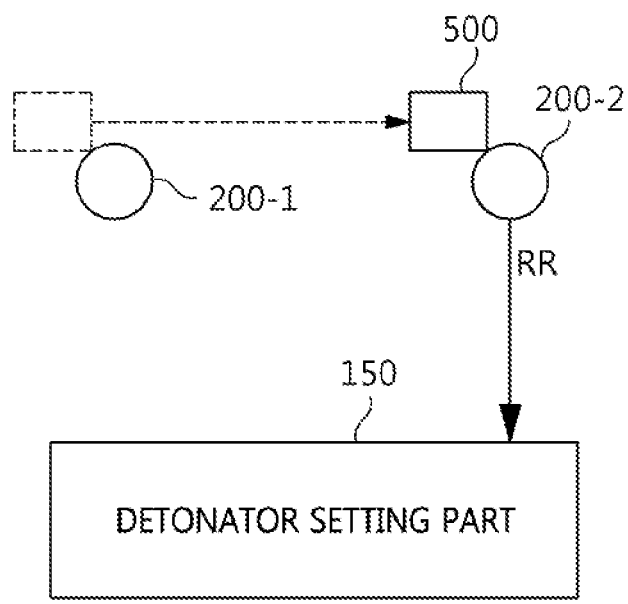
Figure 9:
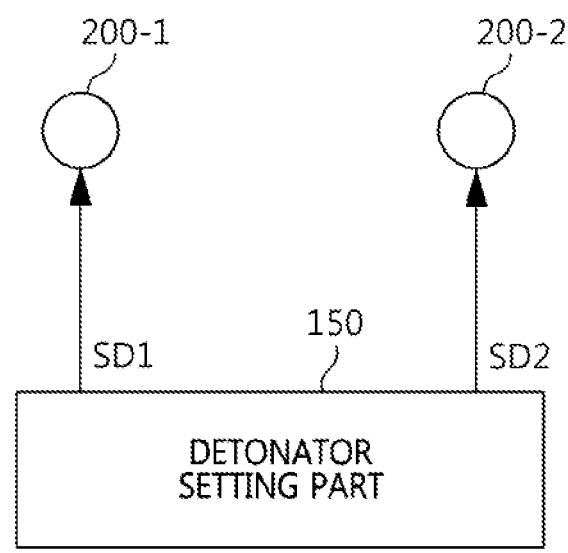

The worker can move along the work path with the worker terminal 500, and drive a first detonator 200-1 and a second detonator 200-2 that are positioned on the work path. For example, as shown in FIG. 6, at a first point of time TT1, the worker can drive the first detonator 200-1. The first detonator 200-1 driven by the worker may transmit a register request RR to the detonator setting part 150 of the central control unit 100 (referring to FIG. 1). As shown in FIG. 7, at a second point of time TT2, the worker may drive the second detonator 200-2. The second detonator 200-2 driven by the worker may transmit the register request RR to the detonator setting part 150.

The detonator setting part 150 may extract a first position W1 of the worker at the time of the first point of time TT1, that is, when the detonator setting part 150 receives the register request RR. The detonator setting part 150 may match the first worker position W1 with the blasting design map. That is, the detonator setting part 150 may confirm a designed detonator position P1 closest to the first worker position W1 at the time when the detonator setting part 150 receives the register request RR in the blasting design map. Further, the detonator setting part 150 may identify the detonator corresponding to the confirmed designed position P1 as the first detonator 200-1 transmitting the register request RR at the first point of time TT1.

The detonator setting part 150 may extract a second position of the worker at a second point of time TT2, that is, at the time when the detonator setting part 150 receives the register request RR. The detonator setting part 150 may match the second worker position W2 with the blasting design map. That is, the detonator setting part 150 may confirm a designed detonator position P2 closest to the second worker position W2 at the time when the detonator setting part 150 receives the register request RR on the blasting design map. Further, the detonator setting part 150 may identify the detonator corresponding to the confirmed designed position P2 as the second detonator 200-2 transmitting the register request RR at the second point of time TT2.

The detonator setting part 150 may transmit first setting data SD1 to the first detonator 200-1, and transmit second setting data SD2 to the second detonator 200-2. The first setting data SD1 may include setting information, an initialization time, and a delay time of the first detonator 200-1, and the second setting data SD2 may include setting information, an initialization time, and a delay time of the second detonator 200-2.

Figure 10:
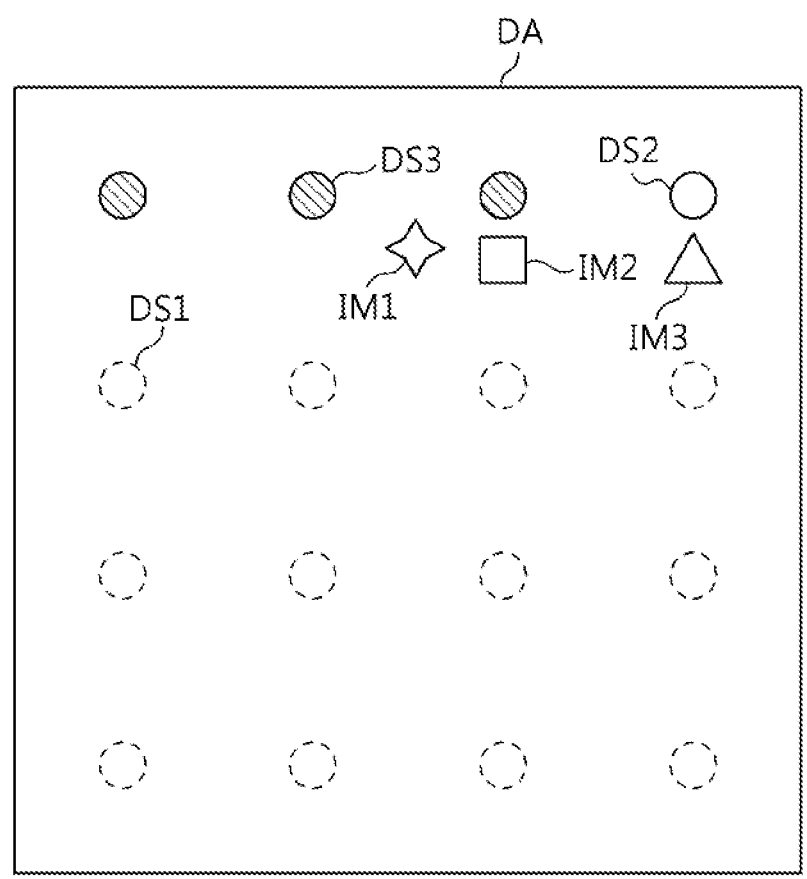
FIG. 10 is a view showing a display range of a display part according to an embodiment of the present disclosure.

FIG. 10 is a view showing a display range of the display part 160 according to the embodiment of the present disclosure.

Referring to FIGS. 1, 4, and 10, the display part 160 may display the positions of the drilling device 300, the charging device 400, and the worker terminal 500 on a display area. For example, the display part 160 may indicate the position of the worker terminal 500 as a first image IM1, the position of the charging device 400 as a second image IM2, and the position of the drilling device 300 as a third image IM3. For convenience of description, the first to third images IM1, IM2, and IM3 are illustrated as arbitrary shapes (star, rectangle, and triangle) in FIG. 10, but the present disclosure is not limited thereto. In some embodiment, the display part 160 may indicate the positions of the drilling device 300, the charging device 400, and the worker terminal 500 in various ways on the display area.

Further, the display part 160 may display the drilling states and the charging states of the blasting holes 30 on the display area DA. For example, the display part 160 may indicate a first state in which the drilling is not completed with a first state image DS1, a second state in which drilling is completed and charging is not completed with a second state image DS2, and a third state image in which charging is completed with a third state image DS3. For convenience of description, the first to third state images DS1, DS2, and DS3 are illustrated with arbitrary shapes (dotted circle, solid-line circle, and patterned circle), but the present disclosure is not limited thereto. In some embodiments, the display part 160 may display the drilling states and the charging states of the blasting holes 30 in various ways on the display area DA.

Figure 11:
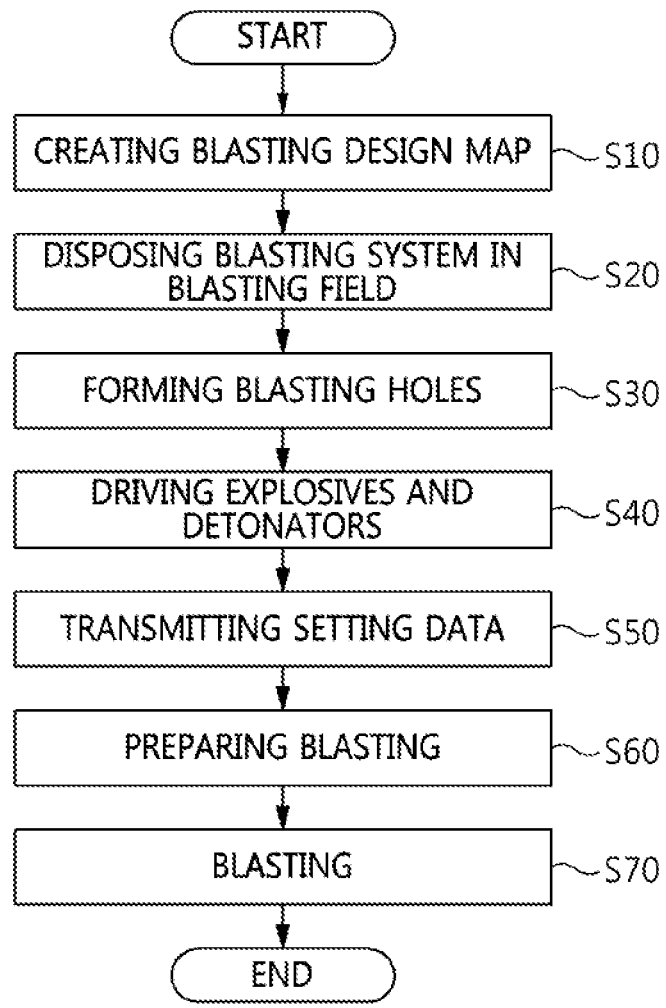
FIG. 11 is a flowchart showing an operating method for a blasting system according to an embodiment of the present disclosure.

FIG. 11 is a flowchart showing an operating method for a blasting system according to an embodiment of the present, disclosure.

Referring to FIGS. 1 to 11, the blasting design map may be created (S10). For example, on the basis of the map data, the blasting design map may include: the position information (P1, P2, to Pn, n is a natural number of 3 or more) about the designed positions of the blasting holes on the blasting target 20; the group information (G1, G2, to Gm, m is a natural number of 3 or more) about each of the detonators 200; the identifiers (I1, I2, to In) of the detonators 200; and the delay times (D1, D2, to Dn), the setting information (S1, S2, to Sn), and the initialization time (T1, T2, to Tn) for each of the detonators 200. The created blasting design map may be stored in the storage part 110 of the central control unit 100.

The blasting system 10 may be disposed in the blasting field (S20). That is, the central control unit 100, the drilling device 300, the charging device 400, the worker terminal 500, and the monitoring device 600 of the blasting system 10 may be disposed in the blasting field in which the blasting target is positioned. In some embodiments, the central control unit 100 may be placed away from the blasting target 20, the drilling device 300, the charging device 400, and the monitoring device 600 may be placed close to the blasting target 20, and the worker with the worker terminal 500 may be positioned close to the charging device 400.

The drilling device 300 of the blasting system 10 may form the blasting holes 30 (S30). That is, the drilling device 300 may form the blasting holes 30 at the designed positions on the basis of the blasting design map.

The charging device 400 of the blasting system 10 charges the explosives 40 and the detonators 200 into the blasting holes 30, and then the detonators 200 may be driven by the worker (S40). That is, the charging device 400 may charge the explosives 40 and the detonators 200 into the blasting holes 30. Then, the detonators 200 may be driven by the worker. In some embodiments, immediately after the charging device 400 charges the detonator 200 into the blasting hole, the worker can drive the detonator 200.

The central control unit 100 of the blasting system 10 may transmit relevant setting data to the detonators 200 (S50). That is, when the detonators 200 are driven by the worker, the detonators 200 may transmit the register request RR to the detonator setting part 150 of the central control unit 100. The detonator setting part 150 receiving the register request RR may match the worker positions at the time when the detonator setting part 150 receives the register request RR with the blasting design map, identify the detonator transmitting the register request RR, and transmit the setting data corresponding to the identified detonators to the identified detonators.

The blasting system 10 may prepare for the blasting (S60). That is, the blasting controller 180 of the central control unit 100 may not generate the blasting command, when at least one of the drilling device 300, the charging device 400, and the worker terminal 500 is positioned within the blasting radius BR. When at least one of the drilling device 300, the charging device 400, and the worker terminal 500 is not positioned within the blasting radius BR, the blasting controller 180 may complete the blasting preparation.

The blasting system 10 may blast the blasting target 20 (S70). That is, the blasting controller 180 may transmit the blasting command to the detonators 200 disposed in the blasting holes 30 in the blasting target 20. Then, the detonators 200 may be exploded by the blasting command received from the blasting controller 180.

Figure 12:
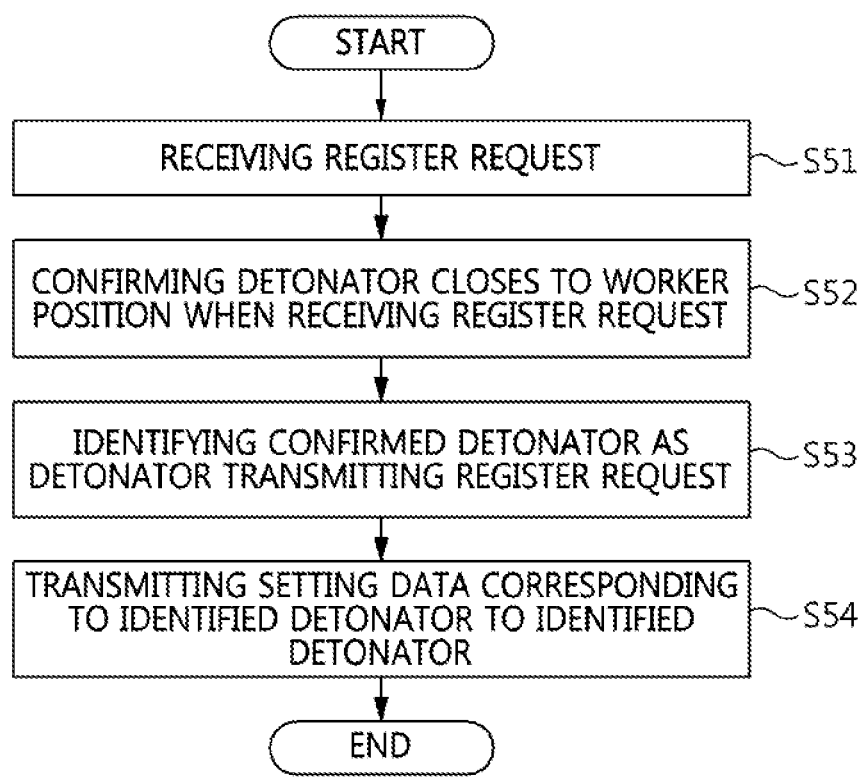
FIG. 12 is a flowchart showing the operating method for a blasting system according to an embodiment of the present disclosure in detail.

FIG. 12 is a flowchart showing the operating method for a blasting system according to an embodiment of the present disclosure in detail.

Referring to FIGS. 1 to 12, the transmitting the relevant setting data shown in FIG. 11 will be described in detail.

The central control unit 100 may receive the register requests RR from the detonators 200 (S51). That is, the detonator setting part 150 of the central control unit 100 may receive the register requests RR from the detonators 200 driven by the worker through the wireless network 700. At this time, the central control unit 100 cannot identify from which detonator transmits the register request RR.

The central control unit 100 may confirm a detonator closest to the worker position at the time when the detonator setting part 150 receives the register request RR (S52). That is, the detonator setting part 150 may confirm, on the basis of the worker position information TI received from the worker terminal 500, the worker position at the time when the detonator setting part 150 receives the register request RR. Then, the detonator setting part 150 may confirm a detonator closest to the confirmed worker position on the basis of the blasting designed map.

The central control unit 100 may identify the confirmed detonator as the detonator transmitting the register request RR (S53). That is, the detonator setting part 150 may identify the confirmed detonator as the detonator transmitting the register request RR.

The central control unit 100 may transmit setting data corresponding to the identified detonator to the identified detonator (S54). That is, the detonator setting part 150 may extract the setting data corresponding to the detonator identified in the blasting design map, and then transmit, the relevant setting data to the identified detonator. For example, the setting data may include setting information, an initialization time, and a delay time of a detonator.

Figure 13:
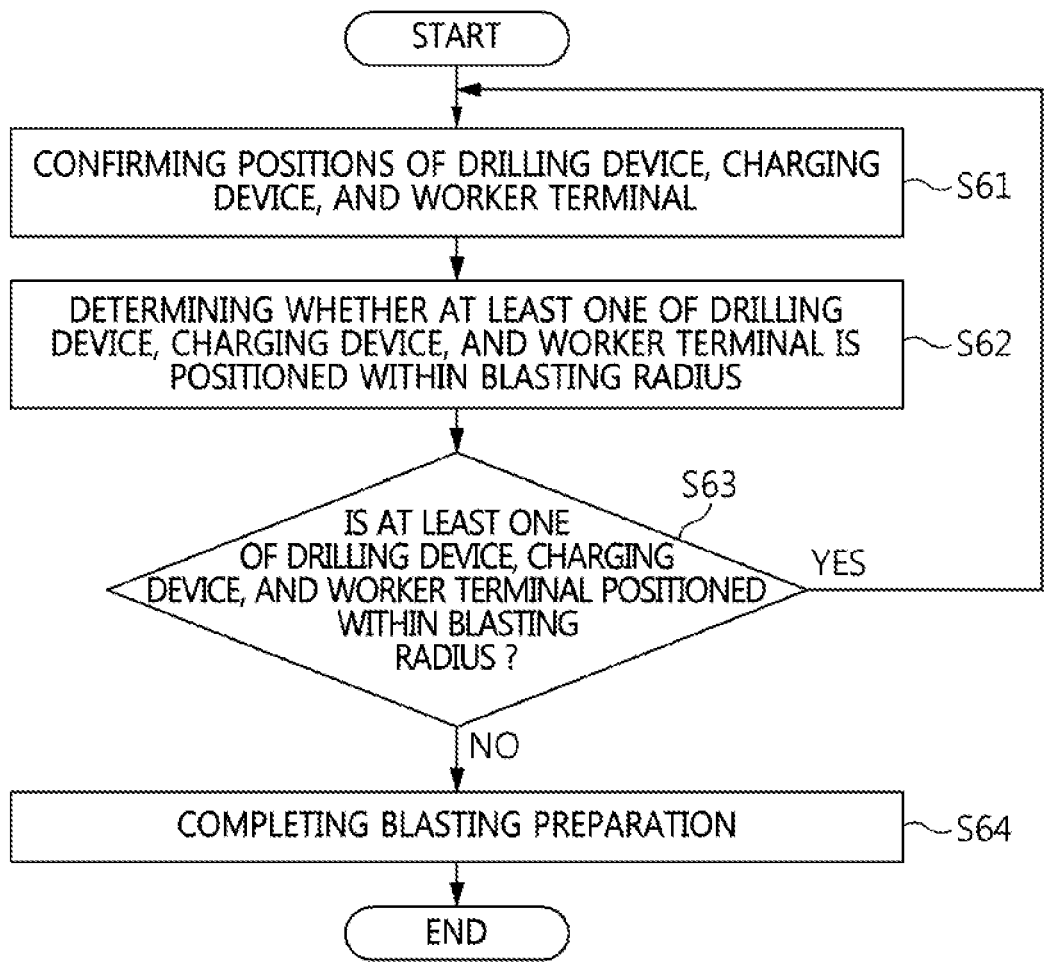
FIG. 13 is a flowchart showing the operating method for a blasting system according to an embodiment of the present disclosure in detail.

FIG. 13 is a flowchart showing the operating method for a blasting system according to an embodiment of the present disclosure in detail.

Referring to FIGS. 1 to 11, and 13, the preparing for the blasting (S60) shown in FIG. 11 will be described in detail.

The central control unit 100 may confirm positions of the drilling device 300, the charging device 400, and the worker terminal 500 (S61). That is, the positioning part 120 of the central control unit 100 may transmit data indicating the positions of the drilling device 300, the charging device 400, and the worker terminal 500 to the blasting controller 180. Accordingly, the blasting controller 180 may confirm the positions of the drilling device 300, the charging device 400, and the worker terminal 500.

The central control unit 100 may determine whether at least one of the drilling device 300, the charging device 400, and the worker terminal 500 is positioned within the blasting radius BR (S62). That is, the blasting controller 180 may determine whether at least one of the drilling device 300, the charging device 400, and the worker terminal 500 is within the blasting radius BR included in the blasting design map.

The central control unit 100 may perform the step S61 again, when at least one of the drilling device 300, the charging device 400, and the worker terminal 500 is positioned within the blasting radius BR (YES in S63). That is, as a result of the determination, when at least one of the drilling device 300, the charging device 400, and the worker terminal 500 is positioned within the blasting radius BR, the blasting controller 180 may not generate the blasting command. Then, the blasting controller 180 may perform again the confirming the positions of the drilling device 300, the charging device 400, and the worker terminal 500.

When at least one of the drilling device 300, the charging device 400, and the worker terminal 500 is not positioned within the blasting radius BR (NO in S63), the central control unit 100 may complete the blasting preparation (S64). That is, as the result of the determination, when at least one of the drilling device 300, the charging device 400, and the worker terminal 500 is not positioned within the blasting radius BR, the blasting controller 150 may complete the blasting preparation, and may initiate the blasting.

As described above, the blasting system and the operating method for the same according to embodiments of the present disclosure can automatically connect the detonator to the central control unit.

Further, the blasting system and the operating method for the same according to embodiments of the present disclosure can improve the worker convenience of the blasting work.

Although the exemplary embodiments of the present disclosure have been described for illustrative purposes, those skilled in the art or those having ordinary knowledge in the art will appreciate that various modifications, additions and substitutions are possible without departing from the scope and spirit of the present disclosure as disclosed in the accompanying claims.

Therefore, the technical scope of the present disclosure is not limited to the exemplary embodiments described herein, but should be determined on the basis of the claims.

The invention claimed is:

1. A blasting system comprising:
   a drilling device configured to form blasting holes on a blasting target on the basis of a blasting design map;
   a charging device configured to place explosives in the blasting holes;
   detonators configured to detonate the explosives;
   a central control unit configured to confirm a position of a worker in real time, the worker driving the detonators; and
   a worker terminal configured to transmit worker position information to the central control unit, the worker position information indicating the worker position,
   wherein the detonators are configured such that, when a detonator is driven by the worker, the detonator transmits a register request to the central control unit, and
   the central control unit comprises a detonator setting part configured to match the worker position at a time when the central control unit receives the register request with the blasting design map, to identify the detonator transmitting the register request, and to transmit setting data corresponding to the identified detonator to the identified detonator, and
   the setting data includes setting information, an initialization time, and a delay time.

2. The blasting system of claim 1, wherein the detonator setting part is configured to confirm a detonator closest to the worker position at the time when the central control unit receives the register request in the blasting design map, and to identify the confirmed detonator as the detonator transmitting the register request.

3. The blasting system of claim 2, wherein the central control unit comprises:
   a storage part configured to store the blasting design map;
   a positioning part configured to confirm a position of the drilling device, a position of the charging device, and a position of the worker terminal;
   a display part configured to display the blasting design map, the position of the drilling device, the position of the charging device, and the position of the worker terminal; and
   a blasting controller configured to transmit blasting commands to the detonators.

4. The blasting system of claim 3, wherein, when at least one of the drilling device, the charging device, and the worker terminal is positioned within a blasting radius, the blasting controller generates no blasting command.

5. The blasting system of claim 3, wherein the central control unit further comprises:
   a drilling controller generating a first alarm, when the drilling device reaches designed positions of the blasting holes,
   wherein, while the blasting holes are formed by the drilling device, the drilling controller receives drilling data indicating a drilling state from the drilling device.

6. The blasting system of claim 5, wherein the central control unit further comprises:
   a charging controller generating a second alarm, when the charging device reaches the designed positions of the blasting holes,
   wherein, while the explosives are placed into the blasting holes by the charging device, the charging controller receives charging data indicating a charging state from the charging device.

7. The blasting system of claim 6, wherein the display part is configured to further display the drilling state and the charging state.

8. The blasting system of claim 1, further comprising:
   a monitoring device configured to capture in the air an image of a blasting field in which the blasting target is positioned.

9. An operating method for a blasting system, the operating method comprising:
   creating a blasting design map including designed positions where blasting holes are formed on a blasting target;
   arranging the blasting system on a blasting field where the blasting target is positioned, the blasting system including a central control unit, a drilling device, a charging device, and a worker terminal;
   forming, by the drilling device, the blasting holes on the basis of the blasting design map;
   placing explosives and detonators in the blasting holes by the charging device and then driving the detonators by a worker;
   matching a worker position at a time when the central control unit receives a register request with the blasting design map, identifying a detonator transmitting the register request, and transmitting setting data corresponding to the identified detonator to the identified detonator;

preparing for blasting; and transmitting a blasting command to the detonator, wherein the detonators are configured such that, when a detonator is driven by the worker, the detonator transmits the register request to the central control unit, and the setting data includes setting information, an initialization time, and a delay time.

10. The operating method of claim 9, wherein the transmitting the setting data comprises:

receiving the register request by the central control unit;

confirming, by the central control unit, a detonator closest to the worker position at the time when the central control unit receives the register request in the blasting design map;

identifying, by the central control unit, the confirmed detonator as the detonator that transmits the register request; and transmitting, by the central control unit, the setting data corresponding to the identified detonator to the identified detonator.

11. The operating method of claim 9, wherein the preparing the blasting comprises:

confirming positions of the drilling device, the charging device, and the worker terminal;

determining whether or not at least one of the drilling device, the charging device, and the worker terminal is positioned within a blasting radius; and completing the blasting preparation, when at least one of the drilling device, the charging device, and the worker terminal is not positioned within the blasting radius.

* * * * *